(12) United States Patent
Haynold

(10) Patent No.: US 11,676,123 B2
(45) Date of Patent: *Jun. 13, 2023

(54) NETWORK SWITCH AND TERMINAL DEVICE

(71) Applicant: Chicago Mercantile Exchange Inc., Chicago, IL (US)

(72) Inventor: Oliver Markus Haynold, Evanston, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,886

(22) Filed: Aug. 20, 2021

(65) Prior Publication Data

US 2021/0383340 A1    Dec. 9, 2021

Related U.S. Application Data

(63) Continuation of application No. 16/436,112, filed on Jun. 10, 2019, now Pat. No. 11,126,983.

(51) Int. Cl.
*G06Q 20/14* (2012.01)
*G06Q 20/16* (2012.01)
(Continued)

(52) U.S. Cl.
CPC .......... *G06Q 20/145* (2013.01); *G06Q 20/16* (2013.01); *G06Q 20/322* (2013.01); *G06Q 30/0206* (2013.01)

(58) Field of Classification Search
CPC .... G06Q 20/145; G06Q 20/16; G06Q 20/322; G06Q 30/0206; G06Q 30/04; G06Q 40/04
See application file for complete search history.

(56) References Cited

U.S. PATENT DOCUMENTS 7,039,610 B2    5/2006   Morano et al.
7,831,491 B2   11/2010   Newell et al.
(Continued)

OTHER PUBLICATIONS

Andrade, H., Gedik, B., Kun-Lung Wu, Yu, P.S; "Scale-Up Strategies for Processing High-Rate Data Streams in System S"; 2009 IEEE 25th International Conference on Data Engineering (pp. 1375-1378) (Year: 2009).*

(Continued)

*Primary Examiner* — Elda G Milef
(74) *Attorney, Agent, or Firm* — Lempia Summerfield Katz LLC

(57) ABSTRACT

An apparatus and a computer implemented method for managing data streams to a terminal device according to peak levels is disclosed. A streaming device (e.g., exchange device) may provide the data streams in response to requests received from the terminal devices. A network device in the communication path between the streaming device and the terminal device may route the data streams. At least one of the exchange device, the network device, and the terminal device is configured to identify an extended time period for a data stream between a streaming device and a terminal device, determine at least one representative time period within the extended time period, determine a quantity of discrete messages for the at least one representative time period, and calculate the coincident value for the streaming device and the terminal device over the extended time period based on the quantity of discrete messages, for the at least one representative time period, from the exchange device to at least the terminal device.

20 Claims, 10 Drawing Sheets

(51) Int. Cl.
*G06Q 20/32* (2012.01)
*G06Q 30/0201* (2023.01)

(56) References Cited

U.S. PATENT DOCUMENTS

| | | | |
|---|---|---|---|
| 7,853,499 | B2 | 12/2010 | Czupek et al. |
| 8,843,592 | B2 | 9/2014 | Jensen |
| 2005/0096999 | A1 | 5/2005 | Newell et al. |
| 2005/0203826 | A1 | 9/2005 | Farrell et al. |
| 2006/0136318 | A1* | 6/2006 | Rafieyan ............... G06Q 30/06 705/37 |
| 2011/0199899 | A1* | 8/2011 | Lemaire ............. H04L 47/2416 370/230.1 |
| 2013/0218739 | A1 | 8/2013 | Kmiec |
| 2014/0006243 | A1 | 1/2014 | Boudreault et al. |
| 2014/0201052 | A1 | 7/2014 | Mintz |
| 2015/0073962 | A1 | 3/2015 | Bixby et al. |
| 2015/0161727 | A1 | 6/2015 | Callaway et al. |
| 2017/0331774 | A1 | 11/2017 | Peck-Walden et al. |
| 2017/0352116 | A1 | 12/2017 | Pierce |
| 2018/0121103 | A1 | 5/2018 | Kavanagh |

OTHER PUBLICATIONS

Badrish Chandramouli, Mohamed Ali, Jonathan Goldstein, Beysim Sezgin, Balan Sethu Raman; "Data Stream Management Systems for Computational Finance"; Computer 2010 (vol. 43, Issue: 12, pp. 45-52) (Year: 2010).*

Chandramouli, Badrish, Mohamed Ali, Jonathan Goldstein, Beysim Sezgin, and Balan Sethu Raman. "Data Stream ManagementSystems for Computational Finance". IEEE Computer Society. Dec. 2010. (Year: 2010).

Extended European Search Report, from EP Application No. 20179072, dated Jul. 29, 2020, EP.

Kolokathis et al., "Cleaner, Smarter, Cheaper Network Tariff Design for a Smart Future", RAP, Jan. 2018, 18 pages.

U.S. Appl. No. 14/452,531, filed Aug. 6, 2014, inventor Oliver Markus Haynold.

U.S. Appl. No. 14/453,601, filed Aug. 6, 2014, inventor Oliver Markus Haynold.

U.S. Appl. No. 14/453,604, filed Aug. 6, 2014, inventor Oliver Markus Haynold.

U.S. Appl. No. 14/797,115, filed Jul. 11, 2015, inventor Oliver Markus Haynold.

* cited by examiner

401

Message Log

| Message | User 1 | User 2 | User 3 | User 4 | User 5 | User 6 | User 7 | User 8 |
|---|---|---|---|---|---|---|---|---|
| MSG 1 | | X | | | | | | |
| MSG 2 | | | | X | | | | |
| MSG 3 | | | | | | | X | |
| MSG 4 | | X | X | X | | | | |
| MSG 5 | | | | | X | X | | |
| MSG 6 | X | | | | | | | X |

Total Message Traffic

| | Time 1 | Time 2 | Time 3 | Time 4 | Time 5 | Time 6 | Time 7 | Time 8 | Time 9 | Time 10 |
|---|---|---|---|---|---|---|---|---|---|---|
| Total | $T_1$ | $T_2$ | $T_3$ | $T_4$ | $T_5$ | $T_6$ | $T_7$ | $T_8$ | $T_9$ | $T_0$ |

⟵——————— ETP ———————⟶

Quantity Matrix

| User | Time 1 | Time 2 | Time 3 | Time 4 | Time 5 | Time 6 | Time 7 | Time 8 | Time 9 | Time 10 |
|---|---|---|---|---|---|---|---|---|---|---|
| TD 1 | $T_{11}$ | $T_{12}$ | $T_{13}$ | $T_{14}$ | $T_{15}$ | $T_{16}$ | $T_{17}$ | $T_{18}$ | $T_{19}$ | $T_{10}$ |
| TD 2 | $T_{21}$ | $T_{22}$ | $T_{23}$ | $T_{24}$ | $T_{25}$ | $T_{26}$ | $T_{27}$ | $T_{28}$ | $T_{29}$ | $T_{20}$ |
| TD 3 | $T_{31}$ | $T_{32}$ | $T_{33}$ | $T_{34}$ | $T_{35}$ | $T_{36}$ | $T_{37}$ | $T_{38}$ | $T_{39}$ | $T_{30}$ |
| TD 4 | $T_{41}$ | $T_{42}$ | $T_{43}$ | $T_{44}$ | $T_{45}$ | $T_{46}$ | $T_{47}$ | $T_{48}$ | $T_{49}$ | $T_{40}$ |
| TD 5 | $T_{51}$ | $T_{52}$ | $T_{53}$ | $T_{54}$ | $T_{55}$ | $T_{56}$ | $T_{57}$ | $T_{58}$ | $T_{59}$ | $T_{50}$ |
| TD 6 | $T_{61}$ | $T_{62}$ | $T_{63}$ | $T_{64}$ | $T_{65}$ | $T_{66}$ | $T_{67}$ | $T_{68}$ | $T_{69}$ | $T_{60}$ |
| TD 7 | $T_{71}$ | $T_{72}$ | $T_{73}$ | $T_{74}$ | $T_{75}$ | $T_{76}$ | $T_{77}$ | $T_{78}$ | $T_{79}$ | $T_{70}$ |
| TD 8 | $T_{81}$ | $T_{82}$ | $T_{83}$ | $T_{84}$ | $T_{85}$ | $T_{86}$ | $T_{87}$ | $T_{88}$ | $T_{89}$ | $T_{80}$ |

FIG. 4C

NETWORK SWITCH AND TERMINAL DEVICE

CROSS REFERENCE TO PRIOR APPLICATION

This application is a continuation under 35 U.S.C. § 120 and 37 C.F.R. § 1.53(b) of U.S. patent application Ser. No. 16/436,112 filed Jun. 10, 2019, which is hereby incorporated by reference in its entirety.

BACKGROUND

An electronic financial exchanges, such as a futures exchange, such as the Chicago Mercantile Exchange Inc. (CME) may include a clearing house that settles and guarantees matched transactions in contracts occurring through the facilities of the exchange. The electronic financial exchange may act as a facilitator to make an exchange between market participant. In addition, the clearing house establishes and monitors financial requirements for clearing members and conveys certain clearing privileges in conjunction with the relevant exchange markets.

The electronic financial exchange may also provide information such as quotes, orders, trades, or statistics to market participants or other subscribers. The information may be a stream of data published by the electronic financial exchange. The information may be directly transmitted to subscribers automatically according to a subscription or selectively according to individual requests for information received from the subscribers.

The information is transmitted from the electronic financial exchange to the subscribers using one or more computer systems and network components. Subscribers may request or otherwise receives all information available even when certain portions of the information are not processed by the subscriber. In other circumstances, the subscriber may receive frequent updates for a particular value that are unnecessary to the subscriber. Additional or superfluous distribution of information may strain the computer systems and network components that are used to transmit the information. The processing of this flow of information and associated overhead consumes bandwidth and processing time. Therefore, there is a need in the art for an improved exchange of information between the electronic financial exchange and the subscribers that reduces the amount of information processed and transmitted by the computer systems and network components.

BRIEF DESCRIPTION OF THE DRAWINGS

FIG. 4A depicts an example message log.

FIG. 4B depicts an example peak traffic chart.

FIG. 4C depicts an example quantity matrix.

DETAILED DESCRIPTION

Figure 1:
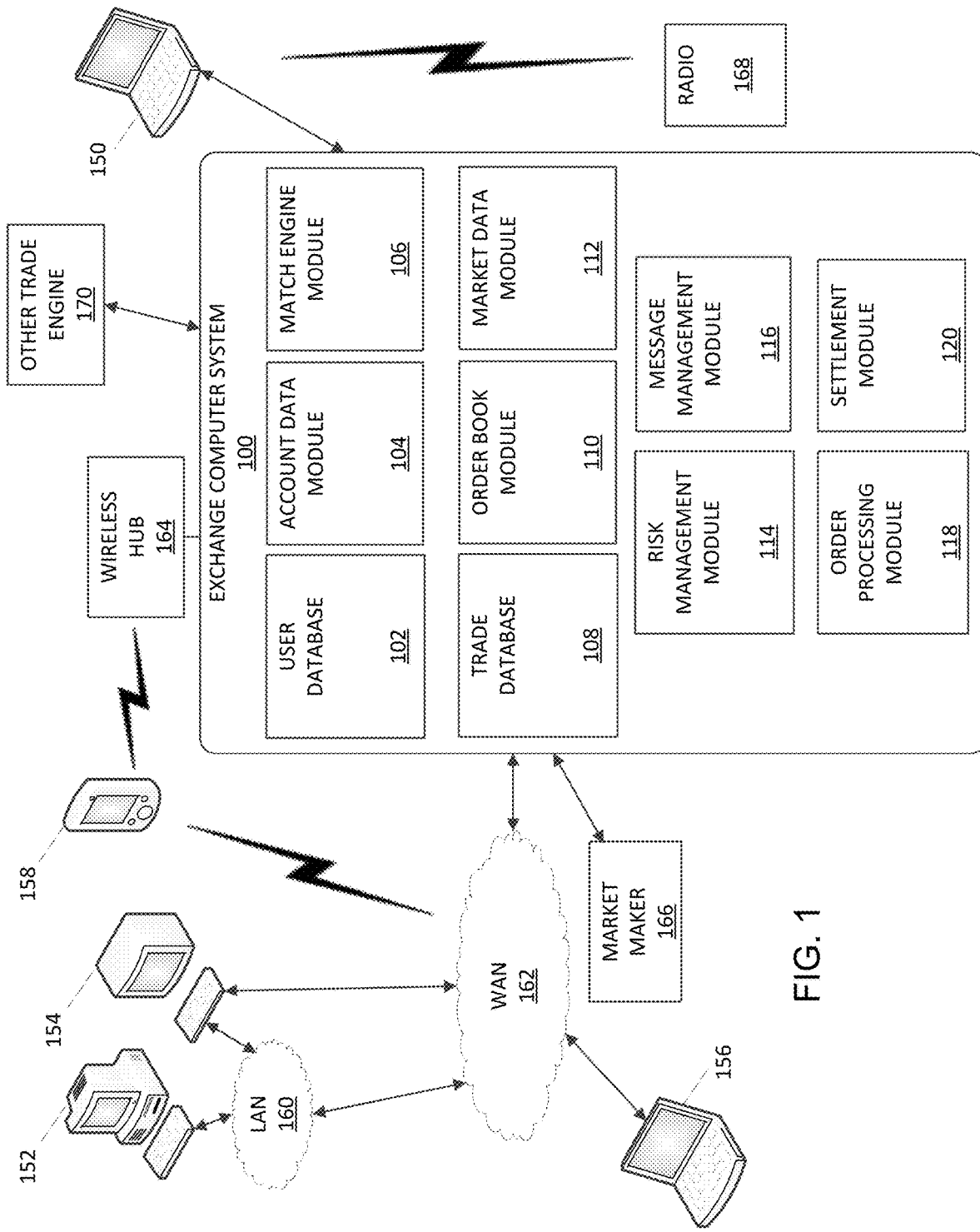
FIG. 1 depicts a computer network system, according to at least some embodiments.

A futures contract provides a mechanism to buy or sell a particular commodity or asset (an underlying asset) at a predetermined price at a specified time in the future. Because futures contracts specify many of the contract conditions (e.g., particular terms such as units, or the underlying asset), they are standardized contracts. Some users buy (or sell) futures contracts because they wish to obtain (or deliver) the underlying asset at the price and time specified in the standardized futures contract. However, other users buy (or sell) futures contracts with the sole intention to sell (or buy) the futures contracts to earn profits based on a price movement of the futures contracts. Others buy or sell futures contracts to hedge or offset risks.

Futures contracts are standardized, so traders buy and sell futures contracts in the units in which the futures contract is offered, or made available for trading by a futures exchange. The futures exchange connects market makers and subscribers for making real time indicative quotes, issuing requests for quotes, obtaining binding quotes and wherein the market maker and subscriber are in communication with an exchange for sending binding quotes and orders to the exchange for clearing and confirming transactions.

In practice, may subscribers request quotes far in excess to their actual needs. Some customers may request quotes for exotic and obscure futures contract that they never trade nor have any intention of trading. Perhaps more common are subscribers that receive quotes at a high rate (updated quickly in time) when the quotes are rarely used but still have a nonzero probability of being used. These superfluous quotes weight down the exchange quote and messaging system.

The disclosed embodiments are directed to lessening the computational load and/or network load of a messaging system through supplementing the messaging system. The computational load and/or network load is adjusted though load messages or coincidental peak messages that describe flows to a particular recipient in the messaging system with respect to aggregate flows for the sender in the messaging system. For example, recipients or associated terminals may adjust their respective message flows, or timing thereof, in response to the load messages or coincidental peak messages.

An exchange computing system which publishes data feeds may need to implement additional computing power and logic to provide the data feeds. The exchange computing system and communication system is designed to handle the peak traffic (e.g., peak recorded traffic or peak potential traffic). In addition, increased data feeds may require such computing power and logic to publish information in a fair manner so that variances in the transmission latencies between the data feeds do not provide an unfair informational advantage to some recipients over others. Reducing the number of data feeds at any given time may reduce the amount of synchronization and message timing controls that may otherwise be necessary to disseminate related information at the same, or nearly the same, time.

Accordingly, the resulting problem is a problem arising in computer systems due to the high volume of disparate messages processed by an exchange computing system. The solutions disclosed herein are, in one embodiment, implemented as automatic responses and actions by an exchange computing system computer. The solutions disclosed herein are, in one embodiment, implemented as automatic adjustments by one or more terminal devices in communication with the exchange computing system computer.

The disclosure describes apparatuses, methods, and systems for tracking messages between one or more terminals and an exchange computer system. The messages may facilitate calculation, determination, generation, management, and analysis of communications relating to financial instruments. The disclosed embodiments may be implemented in association with a data transaction processing system that processes data items or objects, such as the exchange computing system. Customer or user devices (e.g., client computers or terminals) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

An apparatus, e.g., a network switch, tracks the message volume sent by different senders and/or the message volume received by different receivers. The apparatus may keep separate track of and/or assign weights to messages of different kinds, differentiated, e.g., by internet protocol (IP) port numbers or some other header field in the message. The apparatus aggregates this message volume in buckets of time, e.g., full hours, five-minute intervals, full minutes, etc., and transmits it to a billing system. Instead of fixed buckets, this may also be a rolling bucket; e.g., data collection by the minutes, and the peak hour determined as an hour of time starting at the minute with the highest data traffic for the hour starting with that minute. The billing system then applies a charge according to coincident peak charge between the sender and the receiver. The billing system determines the buckets of time during which overall volume, possibly differentiated or weighted by the different kinds of messages, was highest, e.g., the ten busiest hours in the past year, on a rolling basis. It then assigns a cost to those senders or receivers of messages in proportion to their message volume, possibly weighted or differentiated by kind, during those peak hours. A receiver may pay a monthly fee for volume during the ten busiest hours in the past twelve months. This volume charge may further be adjusted by an allowance such as one hundred free peak hour messages for each trade executed during the peak hour. The apparatus may further distribute an overview of total volume in the current hour, possibly differentiated or weighted by kind, to the senders or receivers of messages. This overview of volume is distributed with a frequency larger than that of the time bucket used for billing. This allows the senders/receivers to modify their messaging so as to send/request less traffic during peak periods while not restricting their use of the service during periods of unused capacity.

I. Exchange Computing System

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

The disclosed embodiments may be implemented by an exchange computing system to generate a new type of financial instrument that closely tracks a futures contract based on historical settlement prices of the futures contract, which may be traded on the exchange computing system.

II. Electronic Trading

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

In one embodiment, traders may buy and sell the disclosed tracking financial instrument instead of a futures contract that is associated with an underlying asset, where the futures contract may be settled by delivery of the underlying asset or by cash settlement.

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade therebetween to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations. In addition, the trading system or an associated device may publish or otherwise distribute quotes, market data, and other information electronically via electronic messages exchanged using a network. Users (e.g., terminal devices) may request specific information from the trading system.

Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

As may be perceived/experienced by the market participants from outside the exchange or electronic trading system operated thereby, the following sequence describes how, at least in part, information may be propagated in such a system and how orders may be processed: (1) An opportunity is created at a matching engine of the exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e. counter to the resting order; (5) The exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

III. Electronic Data Transaction Request/Result Messages and Market Data Feeds

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. A market update message may include non-price characteristics of the market such as market depth, which describes inside quantities available at the inside market, or the best ask price and best bid price, or outside quantities available at other levels. A quote message may include a price associated with a tradeable instrument, a price type associated with the tradeable instrument, and a timestamp associated with the price for the tradeable instrument. Outbound messages, or electronic data transaction result messages, may be disseminated via data feeds. A quote message may include an order, a modification to an order, or a cancellation of an order.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP", or Market By Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MB 0") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages may carry much more data than MBP messages because MBO messages reflect information about each order, whereas MBP messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An MBP book data object may include information about multiple values. The MBP book data object may be arranged and structured so that information about each value is aggregated together. Thus, for a given value V (e.g., a price), the MBP book data object may aggregate all the information by value, such as for example, the number of orders having a certain position at value V, the quantity of total orders resting at value V, etc. Thus, the value field may be the key, or may be a unique field, within an MBP book data object. In one embodiment, the value for each entry within the MBP book data object is different. In one embodiment, information in an MBP book data object is presented in a manner such that the value field is the most granular field of information.

An MBO book data object may include information about multiple orders. The MBO book data object may be arranged and structured so that information about each order is represented. Thus, for a given order O, the MBO book data object may provide all of the information for order O. Thus, the order field may be the key, or may be a unique field, within an MBO book data object. In one embodiment, the order ID for each entry within the MBO book data object is different. In one embodiment, information in an MBO book data object is presented in a manner such that the order field is the most granular field of information.

Thus, the MBO book data object may include data about unique orders, e.g., all unique resting orders for a product, and the MBP book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate an MBO book object and an MBP book object. It should be appreciated that each book object, or view for a product or market, may be derived from the MBO book object, which includes all the orders for a given financial product or market.

An inbound message may include an order that affects the MBO book object, the MBP book object, or both. An outbound message may include data from one or more of the structures within the exchange computing system, e.g., the MBO book object queues or the MBP book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

IV. Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module (described below) includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

V. Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

VI. Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$Butterfly = Leg1 - 2*Leg2 + Leg3$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

VII. Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order to create matches therein, are referred to as "implied" orders.

Upon receipt of an incoming order, the identification or derivation of suitable implied orders which would allow at least a partial trade of the incoming outright order to be executed is referred to as "implication" or "implied matching", the identified orders being referred to as an "implied match." Depending on the number of component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number of component financial instruments involved, and whether those component financial instruments further comprise component financial instruments of their own, there may be numerous implied opportunities, the submission of a counter order in response thereto, that would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the exchange will benefit from increased transaction volume. However, identifying implied opportunities may be computationally intensive. One response message may trigger the calculations of hundreds or thousands of calculations to determine implied opportunities, which are then published, e.g., as implied messages, via market data feeds. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counter-offer comes into the exchange, or is placed by a user of the exchange. The orders may be for two different contracts that only differ in delivery dates. It should be appreciated that such orders could be represented as a calendar spread order. Instead of waiting for two appropriate outright orders to be received that would match the two existing or resting orders, the exchange computer system may identify a hypothetical spread order that, if entered into the system as a tradeable spread order, would allow the exchange computer system to match the two outright orders. The exchange may thus advertise or make available a spread order to users of the exchange system that, if matched with a tradeable spread order, would allow the exchange to also match the two resting orders. Thus, the exchange computing system may be configured to detect that the two resting orders may be combined into an order in the spread instrument and accordingly creates an implied order.

In other words, the exchange may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic matching system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradeable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets", the entire disclosure of which is incorporated by reference herein and relied upon. Settlement price determination techniques may be implemented to cover calendar month spread instruments having different deferred month contracts.

Referring again to data transaction processing systems, a system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects. A base object may represent an outright order associated with a financial instrument, and a composite object may represent a spread order associated with a financial instrument.

VIII. Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, ... and N, that is to say, any combination of one or more of the elements A, B, ... or N including any one element alone or in combination with one or more of the other elements which may also include, in combination, additional elements not listed.

Figure 2:
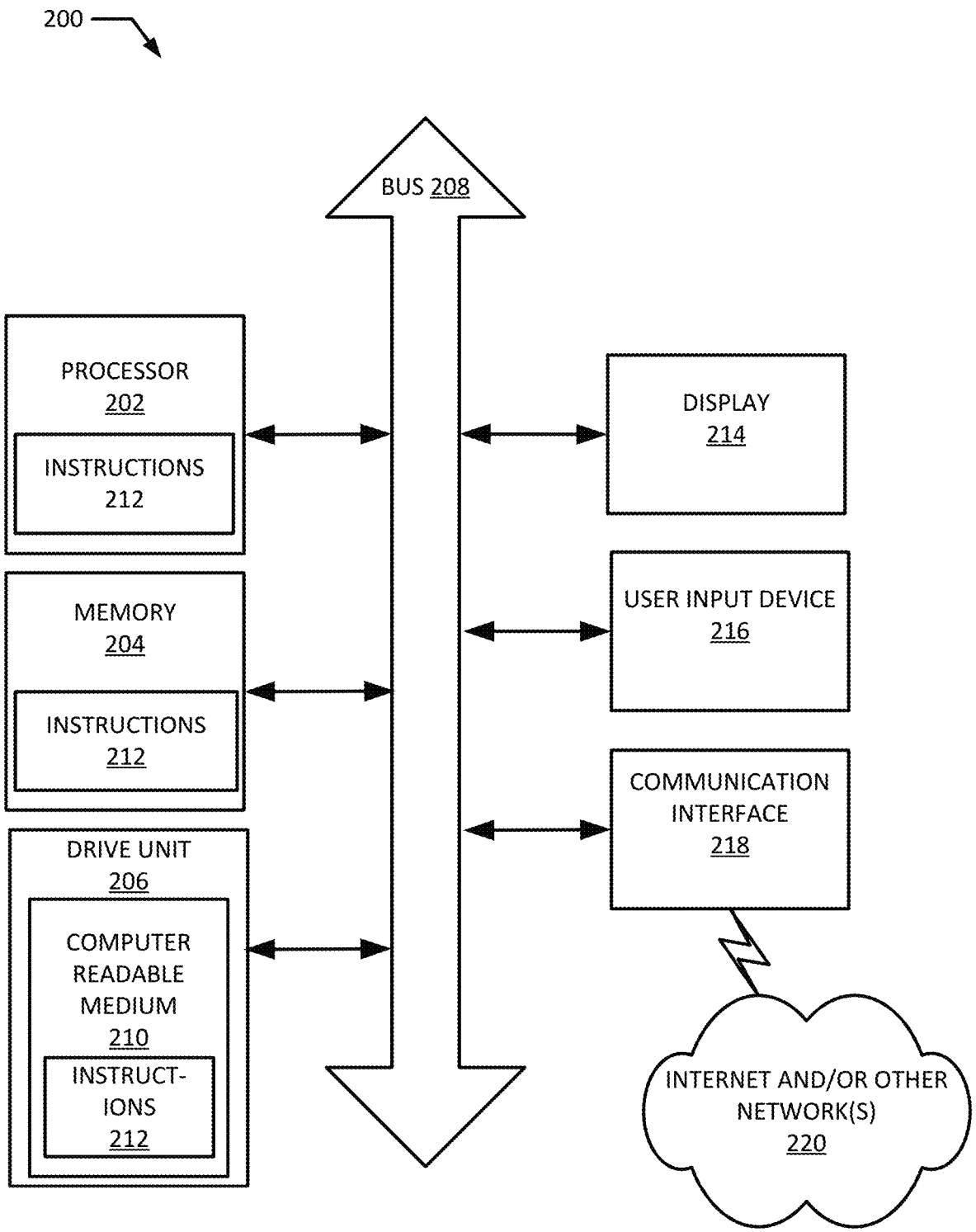
FIG. 2 depicts a general computer system, according to at least some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

The exchange computer system 100 may exchange messages with a few too many computer devices 150, 152, 154, 156 and 158 (e.g., terminal devices). A resource for the exchange computer system 100, which may include mainframe, desktop or other computers, as well as network 160, 162, which may include servers, routers, network interfaces, wired or wireless connections (e.g., cables or radios) for connecting computer systems. The resources are physical hardware capable of communicating a discrete and finite number of messages between the exchange computer system 100 and the terminal devices. That is, a particular server is capable of serving only a maximum number of messages before another server is needed to share the load. Likewise, the exchange computer system 100 is capable of analyzing and/or generating a maximum number of messages before additional resources (e.g., additional component in a distributed computer system) must be assigned to share the node.

Finally, a network, or network component, is capable of transmitting a maximum number of messages, or messages to a maximum number of terminal devices, before additional network components must be added to share the load. Therefore, the message system demonstrates a significant incremental marginal cost as the throughput of the system is increased. However, the message system may be constructed to assign the costs of the system without regards to the incremental marginal cost.

Embodiments of the subject matter and the functional operations described in this specification can be configured to analyze the flow of messages between the exchange computer system 100 and the terminal devices in order to assign the costs of the system according to the incremental marginal cost. More specifically, embodiments are configured to determine coincident peak values that indicate the fraction of messages for particular time periods that contribute to the highest volume of the exchange computer system 100.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange Inc., of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein may utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118.

IX. Coincident Message Flow

Figure 3:
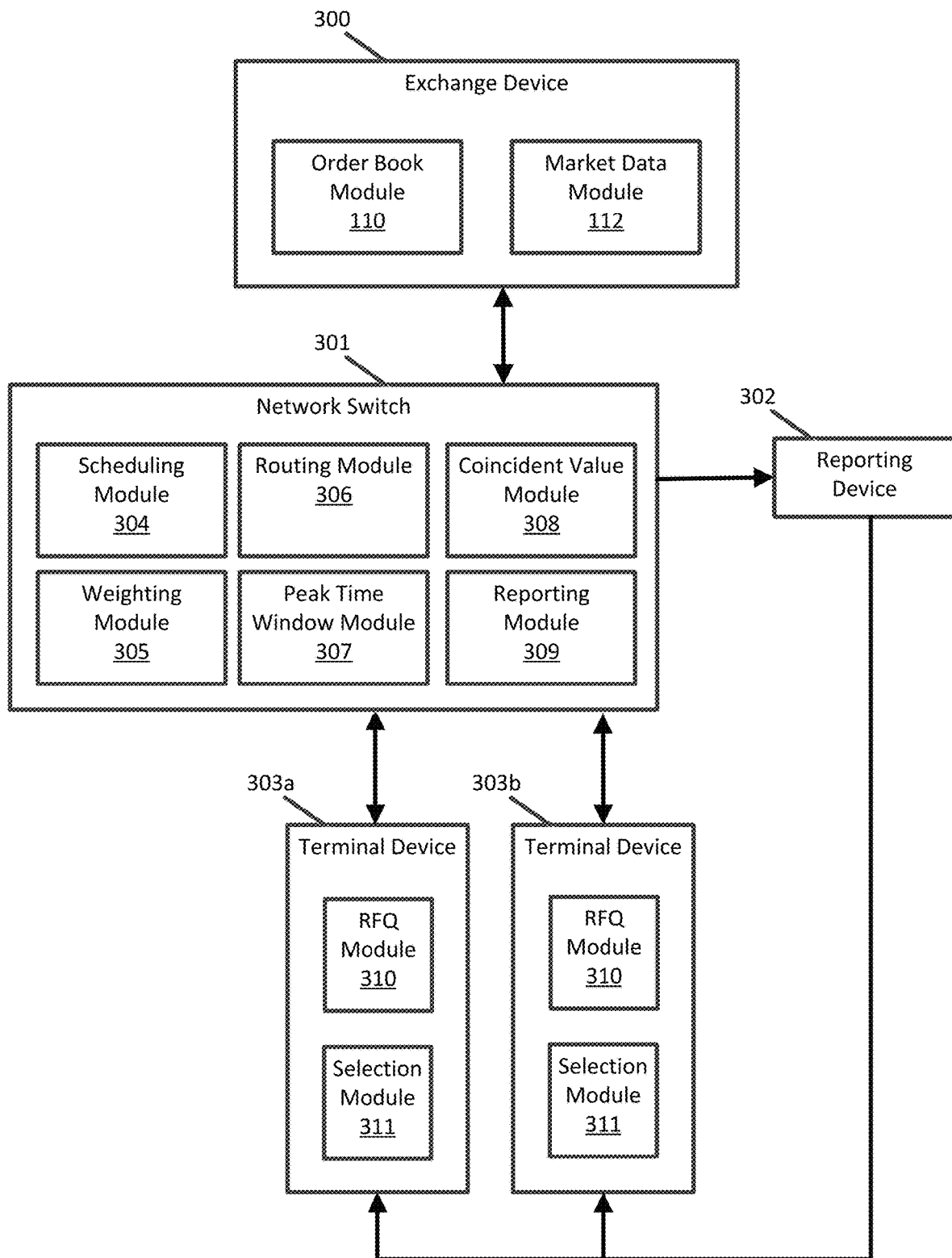
FIG. 3 depicts an exchange device, network device, and terminal device, according to a first embodiment.

FIG. 3 depicts an embodiment including an exchange device 300, network device 301 (e.g., network switch), and one or more terminal devices 303a-b. The exchange device 300 may include any of the components described with respect to the exchange computer system 100 and/or computer system 200 of FIGS. 1 and 2. For ease of illustration and discussion, the exchange device 300 includes an order book module 110 and a market data module 112, but other components may be included. A network device 301 may include components described with respect to the network 220. The network device 301 may include any combination of a scheduling module 304, a weighting module 305, a routing module 306, a peak time window module 307, a coincident value module 308, and a reporting module 309. The reporting module 309 is coupled with a reporting device 302. The reporting device 302 may be a standalone computer system that provides data reports to the terminal devices 303a-b. The one or more terminal devices 303a-b may include a request for quote (RFQ) module 310 and a selection module 312. The one or more terminal devices 303a-b may be referred to individually or collectively as terminal device 303. Additional, different, or fewer components may be included. For example, one or more embodiments may include multiple exchange devices 300 and/or network devices 301. Certain product groups may be associated with a specialized exchange device 300 and/or specialized network device 301 including parameters for the product group. Example product groups may include equities, grains, gold, or other products.

The exchange device 300 may implement the order book module 110 and the market data module 112 using any of the hardware described with respect to FIGS. 1 and 2. The order book module 110 may store a running list of values or prices such as executed prices, bid prices, and ask prices that describe the current, past, or near future market for a tradeable instrument. The running list may be a vector that includes a set number of values over time intervals such that older values drop off the list as new values are added.

The market data module 112 may access information from the order book module 110 for one or more tradeable instruments. The market data module 112 may generate a message including the information from the order book module 110 for the one or more tradeable instruments. The market data module 112 may generate a quote message for the tradeable instrument that describes a price of the last executed trade or describes the highest current ask or lowest current bid for the tradeable instrument. As an alternative to the quote message, the market data module 112 may generate data for a trade, data for an order, or other market statistics.

The market data module 112 may send the message to the network device 301 or the terminal device 303. The market data module 112 may not send the messages to the network device 301, but rather as part of the packet switched network support by the network 160, the network device 301 switches (send, processes, and receives) all data traffic egress from the exchange device 300.

The network device 301 may receive the messages generated from the market data module 112 or otherwise monitor the messages. In one example, the network device 301 via the routing module 306 routes the messages between the exchange device 300 and the terminal device 303. The network device 301 may be part of a network associated with and/or including the exchange device 300. The network device 301 is configured to receive, process, and forward network traffic from the exchange device 300 to the terminal device 303. The network device 301 may operate on one or more layers of the open systems interconnection (OSI) model such as the data layer (layer 2) and/or the network layer (layer 3).

The network device 301 is configured to analyze messages (or packets) received from the exchange device 300. The network device 301 may identify one or more destination addresses from the messages, which may correspond to a terminal device 303. Through the routing module 306, the network device 301 may forward or route the messages according to the destination address. The routing module 306 may access a lookup table or forwarding table to associate the destination address from the message to a next hop address. The network device 301 forwards the message (or packet) to the next hop address, which may be a server, router, or another device configured to forward the message toward the destination address.

The network device 301, via the routing module 306, may generate a log for the destination address of the messages. The messages may be associated with various terminal devices 303a and 303b. The log may sort the quantity of messages destined for terminal device 303a from the quantity of messages destined for terminal device 303b. Any number of terminal devices may be in communication with the exchange device 300 and receive messages from the exchange device 300.

FIG. 4A illustrates an example message log 401 for eight users or terminal devices coupled with the exchange device 300. Each of the messages (e.g., MSG 1, MSG 2, etc.) may correspond to a quote for a particular tradeable instrument and/or for a particular time period. The message log describes the destination (e.g., User 1, User 2, etc.) for each of the messages. A message may have multiple destinations (e.g., many users may subscribe to or request quotes for the same tradeable instrument).

The network device 301 may generate the message log 401 according to the messages or corresponding packets that are received, analyzed, and forwarded by the network device 301. For each received message, the network device 301 may generate an entry in the message log 401 including a message identifier, a destination identifier (e.g., destination address), and a timestamp. In some examples, more than one user may be associated with a single terminal device 303, which may be tracked separately by the message log 401. The message identifier may include data indicative of the tradeable instrument. The message identifier may include the underlying asset, a delivery date, units for the asset, and/or a quantity of the asset. As an alternative to a complete message log, the network device 391 may record (e.g., store into memory) a representative quantity for the number of messages or a traffic intensity associated with the messages. The representative quantity may be a message count for the number of messages that have been received, a message count for the number of messages that have been send, or a message count for the number of messages that have been received or sent. Any of these may be organized according to sender and time interval. In another alternative, the network device 391 may record (e.g., store into memory) a message file size or data count (e.g., in bytes or kilobytes) for the amount of memory required to store any of these sets of messages. When the message data size or count is used for the message log, less memory space is required than when a more detailed log of the messages is retained. The traffic intensity may be measured in messages per unit time or as a change in the rate of messages.

In another example, the message log 401 is a predetermined template with multiple combinations of the possible tradeable instruments. The message log 401 may be a two-dimensional grid with columns for the underlying instruments and rows for the possible delivery dates. Alternatively, the delivery dates may be omitted and a single dimensional array may correspond to elements for the underlying instruments.

The scheduling module 304 may identify an extended time period (ETP) for a data stream of messages between the exchange device 300 and the terminal device 303. The data stream includes information for one or more tradeable instruments associated with the exchange device 300 described in discrete messages from the exchange device 300 to the terminal device 303 in response to a request from the terminal device 303.

The ETP may be the total amount of time under analysis. The ETP may be a subscription period that the terminal device 303 subscribes to market feeds from the exchange device 300. The extended time period may be a month, a year, or another time period. The network device 301 may select the ETP based on a predetermined setting or user input.

FIG. 4B illustrates an example chart for the total message traffic across the ETP. The ETP may be divided into smaller time periods (e.g., Time 1, Time 2, etc.). The ETP may be divided into equal increments having a predetermined size (e.g., hourly, 15 minutes, 1 minute) or into a predetermined number of intervals (e.g., 100 intervals, 1000 intervals, or another number). Each interval may be a length of time for multiple messages to be transmitted through the network device 301.

The network device 301 may categorize the message to the time intervals according to the timestamp included in the messages. The network device 301 may determine the time interval (e.g., Time 1, Time 2, etc.) for each message. Each time interval may include one or two threshold values that defines the time interval. The network device 301 may compare the time stamp of each message to the thresholds for possible time intervals. Each time interval is a potential representative time period. The network device 301 may compare a group of the potential representative time periods and select one or more representative time periods from the group. The representative time period may be calculated according to a peak of total data for the data streams for the terminal devices 303.

The network device 301 may determine a quantity or other representation of the discrete messages for the at least one representative time period. As described above, the representation of the messages may be a count, message size in bytes, or a combination. The representation of the messages may be weighted according to another estimation of the message. The weighting may be a square root of the byte size of the messages, which is a compromise (mathematically) of message count and byte count. The representative time period may be select to according to the flow of traffic or messages between the exchange device 300 and the terminal device 303. The peak time window module 307 determines at least one representative time period within the ETP that corresponds to a peak time interval. The peak time window module 307 may determine a quantity for the number of messages in the extended time period that correspond to each time interval. In the example of chart 403, total traffic quantities $T_1$, $T_2$, etc. are assigned to corresponding time intervals Time 1, Time 2, etc. As the shown by the shading in chart 403, the time intervals Time 3, Time 6, and Time 9 are selected as the representative time periods. In the example, $T_3$ is greater than $T_1$, $T_2$, $T_4$, $T_5$, $T_7$, $T_8$, and $T_0$; $T_6$ is greater than $T_1$, $T_2$, $T_4$, $T_5$, $T_7$, $T_8$, and $T_0$; and $T_9$ is greater than $T_1$, $T_2$, $T_4$, $T_5$, $T_7$, $T_8$, and $T_0$. Once the representative time period has been selected, the network device 301 determines users and/or terminal device associated with the representative time period. In one implementation, the network device 301 is configured to identify potential time periods from the extended time period. The potential time periods may be a predetermined length time window in the extended time period (e.g., every 1 minute is a time window, every hour is a time window, or another time window). The network device 301 is configured to perform a comparison of data usage for the plurality potential time periods and select the at least one representative time period based on the comparison.

FIG. 4C illustrates an example quantity matrix 405 that illustrates the traffic quantities for the time intervals for individual users or terminal devices. The traffic of a user or terminal device may be coincident with the peak of the exchange device 300 when the user or terminal device received messages, or at least a minimum quantity of messages, during the representative time period. The coincident value module 308 may determine an overlap between the representative time periods for the peak traffic from the exchange device 300. The coincident value module 308 of the network device 301 may calculate the coincident value for the exchange device 300 and the terminal device 303 over the extended time period based on the quantity of the discrete messages, for the at least one representative time period, from the exchange device 300 to at least the terminal device 303. The coincident value module 308 may calculate the coincident value for any terminal device 303 based on the traffic quantities for the particular terminal device 303 with respect to the total traffic for the exchange device 300.

The coincident value may be a binary value (e.g., on or off, high or low) that indicates that the particular terminal device 303 sent traffic, and/or received traffic, during the representative period that has been designated a peak period. Terminal devices that received traffic during the representative period are designated with a high value for the coincident value and terminal devices that did not receive traffic during the representative period are designated with a low value for the coincident value. In the case of sent traffic, the traffic may be filtered according to type. The filter may include only messages with orders, modifications to orders, and cancelation of orders and exclude administrative message (e.g., heartbeat messages).

Using the examples of FIGS. 4B and 4C, shading illustrates the peak values used for the coincident value. In FIG. 4B, total traffic quantities $T_3$, $T_6$, and $T_9$ are peak values are shaded. The corresponding positive values (nonzero quantities) in FIG. 4C are also illustrated with shading. Thus, in total traffic quantity $T_3$, the traffic ($T_{43}$) received at terminal device 4 (TD 4) and the traffic ($T_{53}$) received at terminal device 5 (TD 5) have contributed to the peak value. Accordingly, the on values, high values, or nonzero levels for the coincident values for $T_{53}$ and $T_{53}$ are indicated through shading in FIG. 4C.

Alternatively, the coincident values may be fractional or decimal values. The coincident values may be calculated from the proportional effect of the traffic to the terminal devices with respect to the total quantity of traffic. The coincident value for the exchange device 300 for any representative time period with respect to any terminal device describes a contribution of the terminal device to the peak level experienced by the exchange device 300. The coincident value for the exchange device 300 and the terminal device 303 may be a ratio of messages during the representative time period for the terminal device 303 to the total message volume for the exchange device 300.

Equations 1 and 2 provide examples in which the coincident value for the exchange device 300 and the terminal device 303 describes a fraction or ratio of the quantity of messages in the at least one representative period associated with the terminal device 303 to the quantity of messages associated with the exchange device 300. As applicable, there may be a coincident value assigned for each terminal device 303 and at each time period. Equation 1 illustrates that for any representative time period (i) the coincident value CV for a terminal device (j) is provided by the traffic T for the terminal device (j) during the time period (i). The traffic (T) may be a quantity of messages, a quantity of sent messages, a quantity of received message, a byte size of messages, a byte size of messages sent, or a byte size of messages received. Equation 2 provides an example in which the coincident value CV for a terminal device (j) is provided by the square root of the byte size B of the traffic T for the terminal device (j) during the time period (i).

$$CV_{j,i} = T_{j,i} \qquad \text{Eq. 1}$$

$$CV_{j,i} = \sqrt{B_{j,i}} \qquad \text{Eq. 2}$$

In another example, described by Equation 3, the coincident value CV for a terminal device (j) is provided by a fraction with a denominator of the total quantity of traffic $T_i$ and a numerator for the traffic for the terminal device (j) during the time period (i). In addition, Equation 4 illustrates that the coincident value CV for a terminal device (j) is provided by the attributable portion from the terminal device (j) during the time period (i) divided by the summation of the attributable portions from all associated terminal device from $T_i$ to $T_k$, where k is the number of time periods in the extended period.

$$CV_{j,i} = \frac{T_{j,i}}{T_i} \qquad \text{Eq. 3}$$

$$CV_{j,i} = \frac{T_{j,i}}{\sum_{j=1}^{k} T_{j,i}} \qquad \text{Eq. 4}$$

Similarly, the coincident value module 308 may designate a predetermined number of terminal devices as having the high coincident value. For example, the coincident value module 308 may designate that a predetermined number of terminal devices are designated as coincident during the peak values of traffic flow for the exchange device 300. For example, the coincident value module 308 may select the terminal device having the highest message usage during the representative time period. The terminal device having the highest message usage, or messages received, may be determined from the message log 401 or the quantity matrix 405.

The network device 301 may include a weighting module 305 configured to generate weights (e.g., an integer value or a decimal value) for the messages before the coincident value is calculated. Different types of messages may be assigned different weights. Weights may be assigned according to the demand for the quote messages. High demand quotes (e.g., mini-S&P futures) may be assigned a higher weight than low demand quotes (e.g., Singapore fuel oil futures). Weights may be assigned according to asset classification. Quote messages for one asset classification may be assigned a higher weight than quote message for another asset classification. Weights may be assigned to relative time periods. Quote messages for trading days may be assigned a different weight than quote messaged on non-trading days. Quote messages for after trading hours may be assigned a different weight than quote messages during trading hours. Thus, the weighting module 305 may generate one or more weight values that is provided to the coincident value module 308, which calculates the coincident values in response to the weight values. The coincident value module 308 is configured to weight a first type of messages according to a first weight and weight a second type of the messages according to a second weight.

The reporting module 309 or the reporting device 302 is configured to generate a load message, or load report, based on the flow of messages. In embodiments where the reporting device generates the report, the reporting module 309 may provide usage data including the coincident values to the reporting device 302. The load report may be a general message or broadcast to all terminal devices. The load report may be personalized to a particular terminal device 303. The load report may describe current or past usage. In some examples, the usage provides a prediction for future coincident values or peak time periods. In some examples, the usage reports costs for usage that has already occurred. The load message may report the peak values for the extended time period up to a current period of time. The load message may report the current representative time period with respect to prior time periods. The load message may include a formula for the peak processing calculation, including the number of representative time periods, the definition of the representative time periods, and the factors for calculating fees from the representative time periods.

In one example, the load report is provided to the terminal device 303. The load report may include the current volume of messages transmitted in the representative time period. The load report may include a ranking of the current time period with respect to previous time periods. For example, the time interval may be a trading day and the load report may include the ranking of the current (or previous) trading day with respect to earlier trading days in the extended time period, which may be the current calendar year or the previous 12 month rolling window or equivalent number of trading days (e.g., 252 trading days in a year). When the extended time period in the 12 month rolling window is used, the ranking may be expressed as a number representative of the current trading day with respect to the total number of trading days (e.g., 112/252).

The load report or load message may include a raw number for the volume of messages that was transmitted in the representative time period. The network device 301 may generate the load message including a data field for the quantity of messages counted from, for example, the message log 401. In another example, the exchange device 300 may communicate the volume of message directly to the network device 301 for inclusion in the load report.

The load report may include a prediction based on received requests for quotes or other subscriptions. For example, the network device 301 may compare recent quantities of message to historical data to identify a trend in the data. The historical data may be compared to a set of stored templates for past trends. The historical message volume for the exchange device 300 may be extracted from a data field of the load message. The comparison may be a least squares technique or another curve fitting technique. The templates may be categorized and selected according to the composition of the quote messages (e.g., types of quote messages and ratios of the types of quote messages). The load report may include an indication that future quantities of messages may be at peak levels. For example, when the volume of messages trends higher for a certain number of time periods (e.g., days or hours), the probability that the subsequent time period is increased.

In one example, the load message is broadcasted to many terminal devices. For example, all terminal devices associated with the exchange device 300 may receive the load message. In another example, the network device 301 includes a forwarding table and all addresses in the forwarding table are sent a copy of the load message. In another example, the load message is available at a publicly accessible location (e.g., a web address or a uniform resource locator), and terminal devices independently access the load message from the publicly accessible location.

The load message may be personalized for a particular terminal device. The load message may report the coincident value for the terminal device 303 according to the message usage for the terminal device 303. For example, the network device 301 may determine whether a request from the terminal device 303 or a subscription associated with the terminal device 303 includes a message during the subsequent time period. When no message is likely to occur in the subsequent time period, no load message is sent to the terminal device 303.

In one example, the load message is sent to the reporting device 302 for generating an invoice or subscription pricing for the terminal device 303. The reporting device 302 may be configured to calculate an invoice amount based on the load message and/or the coincident value. For example, as shown by Equation 5, for any representative time period (i) and terminal device (j), the corresponding invoice amount (IA) may be the product of the coincident value (CV) and a scaling factor (SF).

$$IA_{j,i} = CV_{j,i} * SF \qquad \text{Eq. 5}$$

In some examples, the reporting device 302 may use a subset of possible time periods for calculating the invoice amount. The invoice amount may be based only on a predetermined number of coincident values across the entire extended time period. The function maxvalue[n](x) provides the nth highest values from the array x. Equation 6 demonstrates that for an array for the coincident values (CV) and the predetermined number (n), the highest n coincident values, as scaled by a scaling factor (SF) are summed together to calculate the invoice amount (IA).

$$IA = \Sigma_{i=1}^{n} \text{maxvalue}[i](CV_{j,i} * SF) \qquad \text{Eq. 6}$$

Thus, the invoice amount for the terminal device 303 for the past extended time period for the quote messages is calculated based on the representative time periods having highest coincident values. In some examples, for any particular terminal device 303, the invoice amount is based only on the n highest traffic time periods for the exchange device 300. It may be possible that the terminal device 303 does not participate in any of the n highest traffic time periods, and be assigned an invoice amount of zero. The invoice amount and/or associated reports may be generated and distributed by a billing system.

The terminal device 303 is also configured to receive message flow feedback from the exchange device 300 or network device 301 and adjust or define future quote message requests or subscriptions in response to the message flow feedback. The terminal device 303 may include a subscription list or request list of quote messages that are requested by the terminal device 303 via the RFQ module 310. The terminal device 303 may include a corresponding frequency list that defines how often the quote messages for each of the tradeable instruments on the list are requested. The terminal device 303 may include a priority list that prioritizes each of the tradeable instruments on the list.

The selection module 311 may receive the load message or load report from the reporting device 302 or the network device 301. The selection module 311 may compare the coincident value from the load message or load report with a threshold value. The selection module 311 may select one or more tradeable instruments and modify the request frequency or subscription for the one or more tradeable instrument in response to the comparison. The selection module 311 may select the lowest priority tradeable instruments from the priority list and modify the lowest priority tradeable instruments. The selection module 311 may select the tradeable instruments being requested at the highest frequency based on the frequency list and reduce the frequency for the tradeable instrument. The selection module 311 may cancel or stop request for a subset or all of the tradeable instruments based on the comparison. The modifications in the subscriptions or requests for tradeable instrument quotes determined by the selection module 311 may be implemented through the subsequent requests generated and sent by the RFQ module 310.

In another example, the terminal device 303 may define one or more external settings in response to the change in request frequency. The terminal device 303 may be associated with a broker or other customer facing entity that provides bid and ask quotes to a market participant. In times of normal traffic flow, the bid and ask quotes may be set according to the resting orders received from the order book module 110 at the exchange device 300. The terminal device 303 may adjust the window or spread between the bid and ask quotes in response to the load message or load report, or in response to the modification in the message quote frequency. The spread may be adjusted to be larger than the actual spread. Widening the spread makes it possible to widen the price band when changing quotes. Because the bid and ask price values have farther to move before being outside of the window, fewer quotes are necessary.

For a hypothetical tradeable instrument, the bid price is B and the ask price is A. The terminal device 303 calculates a spread A to B and an enlarged window of A+100 to B−100. If the standard deviation in the change in price for the tradeable instrument is 10 for a time unit, the terminal device 303 may determine that the frequency of the requests for quotes for the tradeable instrument may be reduced by a factor of 5 without concern about the price fluctuating outside of the enlarged window before the next quote is received. The market maker in this example, may operate with fewer quotes for quote messages without taking on significant additional costs.

The exchange device 300 may adjust the invoice amount for the terminal device 303 according to the number of order messages received at the exchange device 300 from the terminal device 303 during the representative time period. The exchange device 300 may count the number of order messages during the representative time period or the number of matched orders during the representative time period and provide a credit against the invoice amount in proportion to the number of order messages or matched messages. Equation 7 provides an example for calculation of the invoice amount (IA) similar to Equation 4 including an adjustment based on a subtraction of a product of the number of order messages or matched orders (Q) and a credit factor (C). In some examples, the number of order messages or matched orders (Q) occur only during the representative time period or the extended time period for the invoice amount. In effect, Equation 5 provides an example where the invoice amount is adjusted by an allowance according to the credit factor (e.g., hundred free peak hour messages for each trade executed during the peak time period.)

$$IA = \Sigma_{i=1}^{n} \text{maxvalue}[i](CV_{j,i} * SF) - (C*Q) \qquad \text{Eq. 7}$$

The network device 301 may also calculate the coincident value and the load message based on order messages. That is, rather than quote messages, or in addition to quote messages, the network device 301 determines a quantity of order messages during the representative time period. The network device 301 is configured to calculate the coincident value for the exchange device 300 and the terminal device 303 over the extended time period based on the quantity of order messages. The exchange device 300 may define peak pricing for trading, orders, or matching transactions for trades that are processed during the peak representative time periods. The coincident value is provided to the terminal device 303 to adjust the number of order messages that are sent during the peak period. The exchange device 300 may analyze historical data over the extended time period to set fees for orders or transactions according to the representative time periods. Each terminal device may be assigned fees based on usage during the representative time period. In one example, the additional fees may only be applied to one or more selected message type that is sent during the representative time periods. The selected message types may include order cancellations, which are likely to slow down the matching and transaction systems. The terminal device 303 may be configured to delay order messages in response to the load message or coincident value received from the network device 301.

Figure 5:
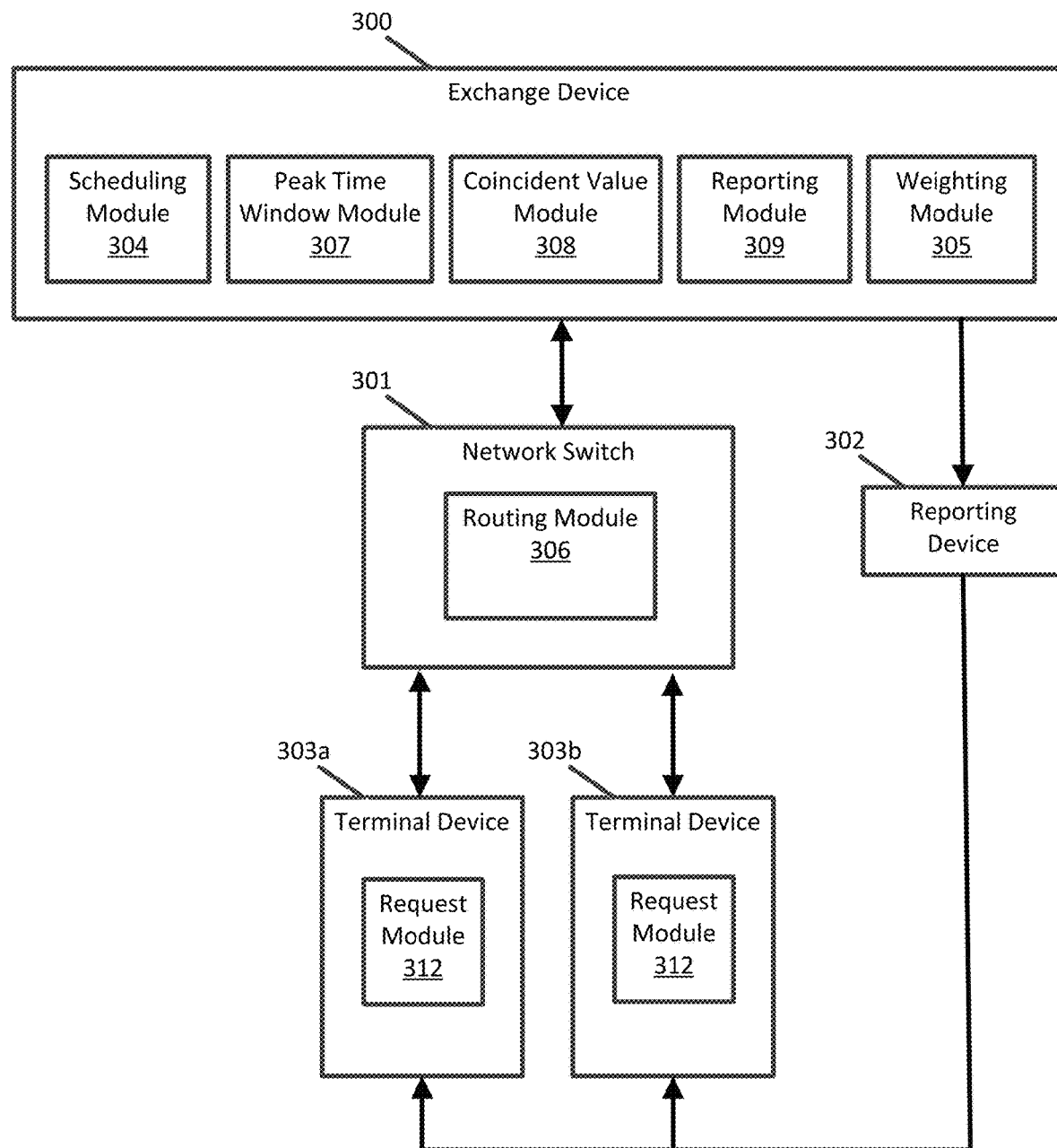
FIG. 5 depicts an exchange device, network device, and terminal device, according to a second embodiment.
Figure 6:
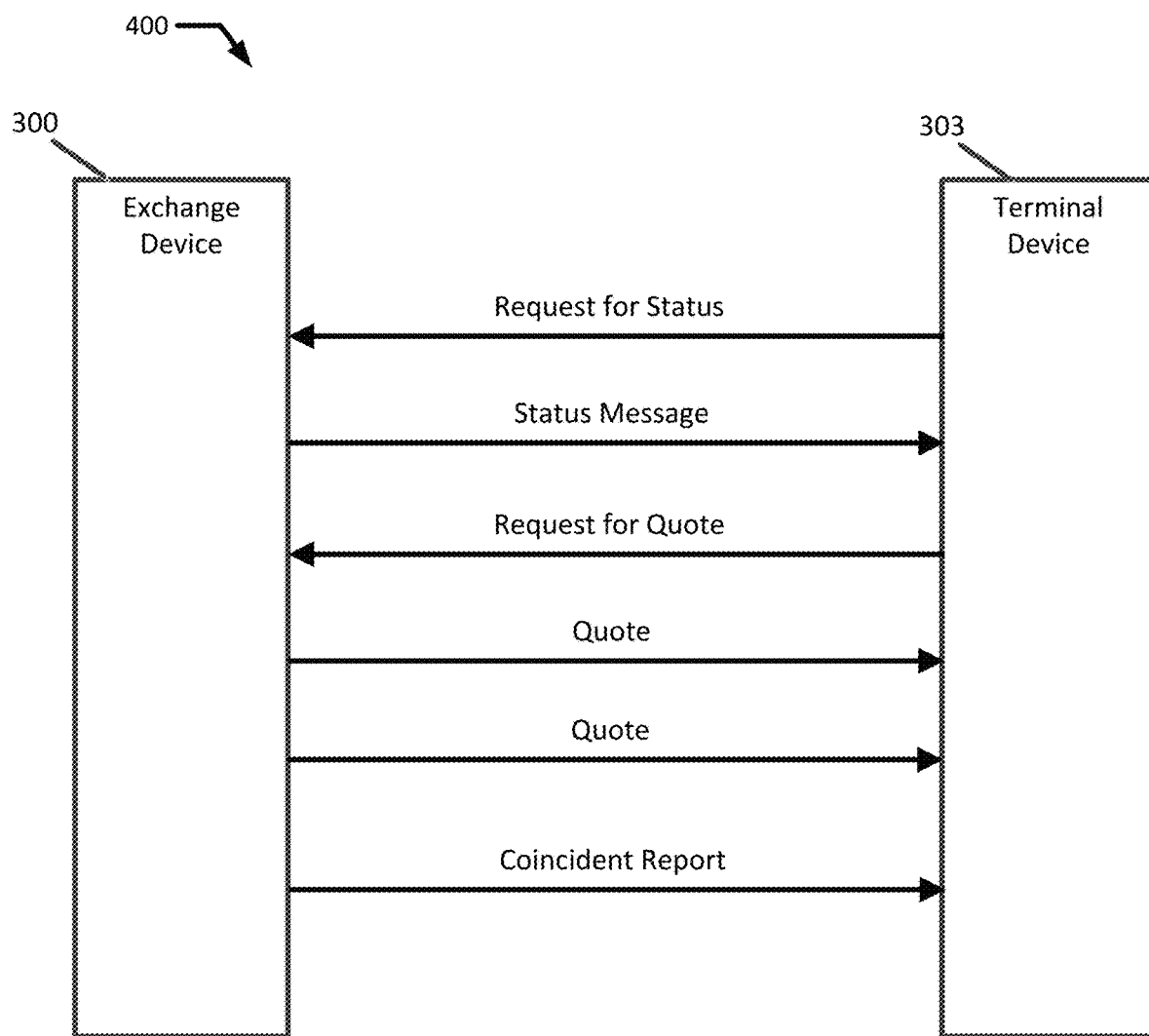
FIG. 6 depicts an example message flow, according to at least some embodiments.

FIG. 5 depicts an embodiment including an exchange device 300, network device 301, and one or more terminal devices 303a-b. In the embodiment of FIG. 5, the coincident value and/or load message is generated at the exchange device 300. While the network device 301 may be omitted, at least one network device such as network device 301 is provided in the communication path between the exchange device 300 and the terminal devices 303a-b. FIG. 6 depicts an example diagram 400 including flows of data between the exchange device 300 and the terminal device 303. Components described in other embodiments may be combined with this embodiment. Additional, different, or fewer components may be included.

The exchange device 300 may include a scheduling module 304, a peak time window module 307, a coincident value module 308, a reporting module 309, and a weighting module 305. The network device 301 includes at least a routing module 306. The terminal device 303 includes at least a request module 312. Descriptions provided in other embodiments herein may be applied to these components.

The terminal device 303, through the request module 312, generates a request for status. The request for status may be sent to the exchange device 300. In response to the request for status, the exchange device 300 generates a status message. The status message may include an indication of the quantity of messages (e.g., quote messages) transmitted by the exchange device 300. The status message may include data indicative of a quantity of message being sent from the exchange device 300 at a current time window.

In one example, the reporting module 309 is configured to generate the status message at the exchange device 300. The status message including a data field that corresponds to the at least one representative time period. As described with other embodiments, the status message may include a ranking of the at least one representative time period with respect to other time periods. Alternatively, the status message may be based on specific time periods and user groups according to the following examples.

The scheduling module 304 configured to identify at least a reporting time period and a representative time period. The reporting time period may be larger than the representative time period. The reporting time period may correspond to a calendar year or a rolling window time period. The representative time period may be a short term time period such as a day or an hour. The ratio of the reporting time period to the representative time period may be a predetermined number. The scheduling module 304 may calculate the duration and/or starting and ending times for the reporting time period.

The peak time window module 307 is configured to calculate the number of messages occurring during the time period. The peak time window module 307 may increment a total message value for the reporting time period and increment individual time values corresponding to specific representative time period and/or specific terminal devices.

The coincident value module 308 is configured to calculate a coincident value for the exchange device 300 and the terminal device 303 over the reporting time period based on the quantities of messages determined by the peak time window module 307. The status message may include the coincident value for the terminal device 303 with respect to total message traffic for the exchange device 300.

In response to the status message, the terminal device 303 may adjust the number of quotes that the terminal device 303 requests from the exchange device 300. The terminal device 303 sends a request for quote generated by request module 312 including the modified list of quotes. In response to the list of quotes in the request for quote or multiple requests for quote, the exchange device 300 sends one or more quote messages to the exchange device 300.

At the end of the reporting time period, the exchange device 300 determines a coincident value for the terminal device 303. The coincident value module 308 of the network device 301 may calculate the coincident value for the exchange device 300 and the terminal device 303 over the extended time period based on the quantity of the discrete messages, for the at least one representative time period, from the exchange device 300 to at least the terminal device 303. The coincident value module 308 may calculate the coincident value for any terminal device 303 based on the traffic quantities for the particular terminal device 303 with respect to the total traffic for the exchange device 300. The exchange device 300 sends a coincident message to the terminal device 303. The coincident message may report a measure of the quote messages sent to the terminal device 303 that are coincident with the peak periods of the exchange device 300.

Figure 7:
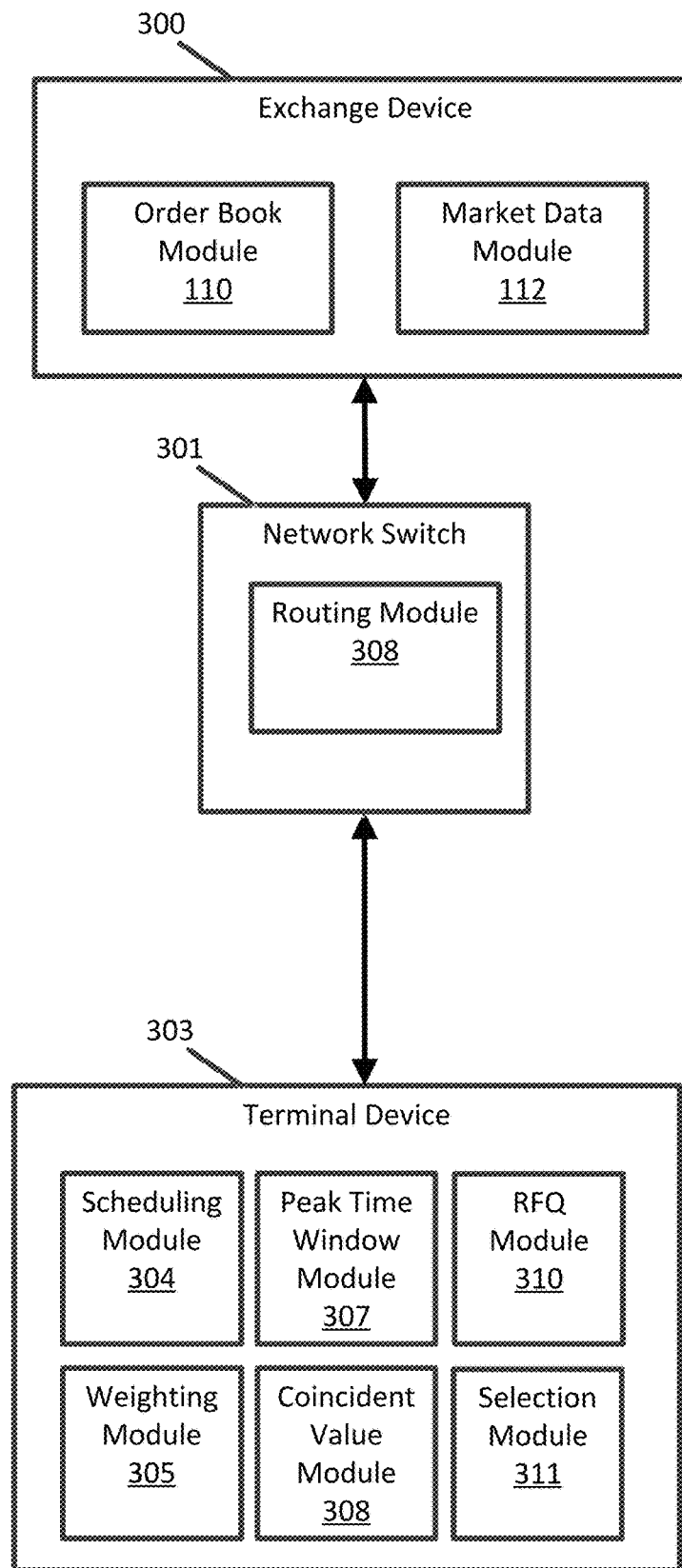
FIG. 7 depicts an exchange device, network device, and terminal device, according to a third embodiment.

FIG. 7 depicts an embodiment including an exchange device 300, network device 301, and one or more terminal devices 303. In this embodiment, the terminal device 303 may internally monitor received messages for information related to peak message flows for the exchange device 300. The terminal device 303 may include a scheduling module 304, a weighing module 305, a peak time window module 307, a coincident value module 308, an RFQ module 310, and a selection module 311. Descriptions provided in other embodiments herein may be applied to these components. Components described in other embodiments may be combined with this embodiment. Additional, different, or fewer components may be included.

The RFQ module 310 is configured to generate a request for a quote message for one or more tradeable instruments. The request for quote may include an identifier for the tradeable instrument, a quantity for the tradeable instrument, and a delivery date. In response to the request, the terminal device 303 receives from the exchange device 300 a data stream including quote messages for the one or more tradeable instruments.

The scheduling module 304 may identify at least one representative time period. The representative time period may be announced by the exchange device 300 through the quote messages. The scheduling module 304 or the peak time window module 307 may receive data parsed from the quote message for data indicative of the representative time period. The scheduling module 304 or the peak time window module 307 may extract data from the data field of the load message for a message volume associated with the exchange device for the extended time period or the representative time period.

The terminal device 303 may receive a load message at the terminal device from the exchange device 300. The selection module 311 may select a data field from the load message that corresponds to the at least one representative time period. In another example, the scheduling module 304 may estimate the representative time period based on one or more external factors such as time of day, day of the week, or news events. The news events may include an announcement from a central bank, an announcement from a political leader, a volatility index, an equities index, an interest rate index, or a trading day schedule. For example, the representative time period may be the hour after the Federal reserve schedules an announcement related to interest rates or market operations. The representative time period may be the first few minutes (e.g., 30 minutes) or last few minutes (e.g., 30 minutes) of a trading day, or a trading day before a holiday, or before earnings for an underlying asset.

The coincident value module 308 is configured to determine a coincident value for the exchange device 300 and the terminal device 303 over the extended time period based the quote messages. The terminal device 303 may calculate a quote request factor in response to the load message and/or the coincident value. The quote request factor determines whether the benefit from the quote request outweighs the cost or potential cost of receiving quote messages during the time period that may be a peak time period as estimated by the coincident value. The terminal device 303 may perform a comparison of the benefit of the quote request to the cost defined by the load message and/or coincident value.

The terminal device 303 may generate a request for quote in response to the quote request factor. The terminal device 303 may filter received user input based on the quote request factor. For example, when the benefit of the quote request is greater than the cost defined by the load message and/or coincident value, the quote request is generated. When the benefit of the quote request is less than the cost defined by the load message and/or coincident value, the quote request is not generated.

In addition, the load message and/or the coincident value may be generated in response to a quantity of order messages, and the terminal device 303 may generate an order request factor in response to the load message and/or the coincident value. The terminal device 303 determines whether the benefit from the order (e.g., providing the ability to offer orders to customers) outweighs the cost or potential cost of sending order messages during the time period that may be a peak time period as estimated by the coincident value.

Figure 8A:
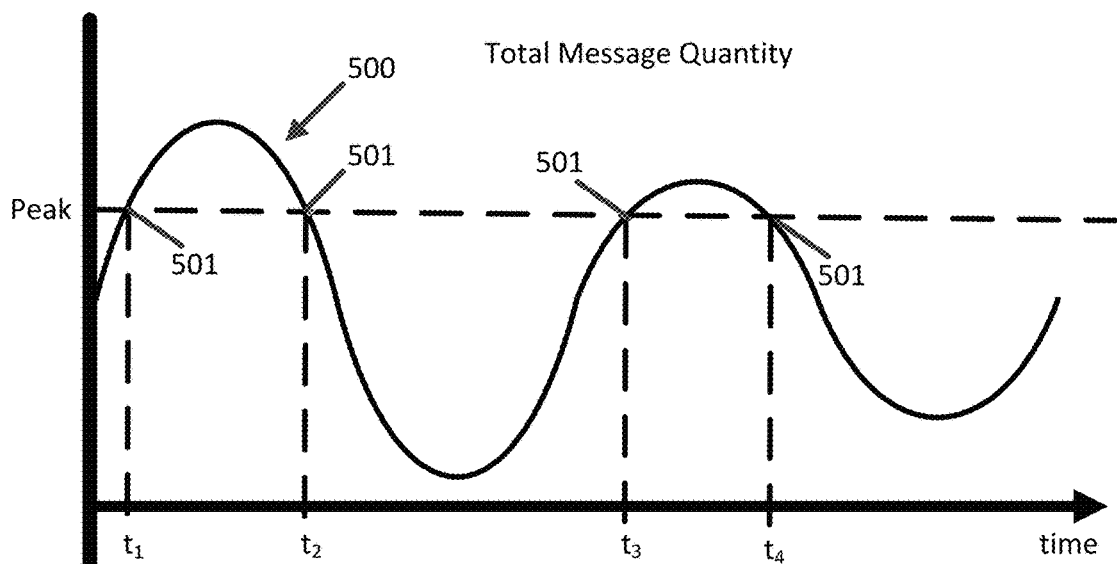
FIGS. 8A, 8B, and 8C illustrate plots of message quantities between the exchange device and the terminal device.
Figure 8B:
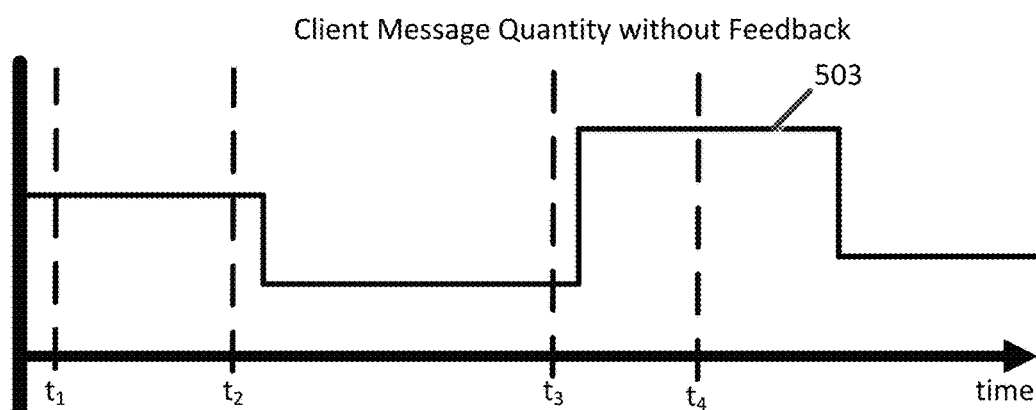
Figure 8C:
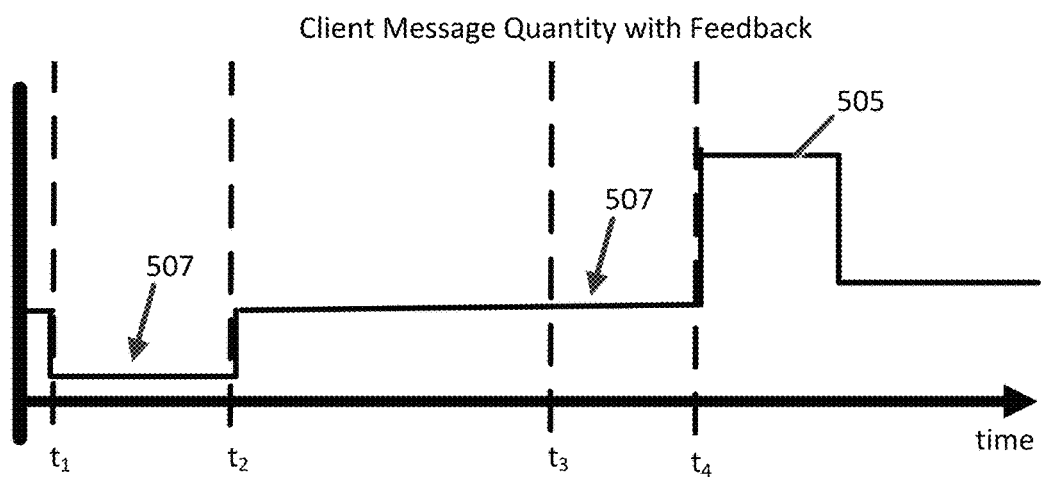

FIGS. 8A, 8B, and 8C illustrate charts for the message traffic for the exchange device 300 and the terminal device 303. FIG. 8A illustrates a plot 500 for the message quantity transmitted from the exchange device 300. The quantity of messages are discrete values, which are only estimated by a continuous curve for the purposes of illustration. A threshold value for the quantity of messages, which is labeled peak, represents a level above which the quantity of messages is at a peak value. The threshold value may vary over time depending on prior quantities of messages during the reporting period. For example, when the peak is set to be the top N time periods, then the threshold value is set at the level of the N highest time period, or the (N+1) highest time period.

The intersection of the threshold value and the plot 500 (i.e., when the plot 500 cross the peak line) indicates time values. Intersection on the rising slope of the plot 500 (e.g., time values $t_1$ and $t_3$) may initiate or trigger the generation of the load message or load report. The total message quantity may be monitored and a derivative of the values determined over time (e.g., change in quantity divided by time). When the derivative or slope of the plot 500 is positive and the current quantity of plot 500 equals or is within a predetermined range of the peak threshold, the load message or load report is generated as sent to the terminal device. In another example, the load message or load report is a status message that remains on alert status until the plot 500 falls below the threshold value. When the derivative or slope of the plot 500 is negative and the current quantity of the plot 500 equals or is within a predetermined range of the peak threshold, the status message or alert is turned off.

FIG. 8B illustrates the message usage for a terminal device 303 associated with the exchange device 300 of FIG. 8A. Plot 503 illustrates a usage pattern for the terminal device 303 without any impact of the load message or load report.

FIG. 8C illustrates the message usage for the terminal device 303 with message requests adjusted in response to the load message or load report. Plot 505 illustrates a usage pattern for the terminal device 303 that has been adjusted to avoid peak time periods. During the time periods from $t_1$ to $t_2$ and $t_3$ to $t_4$, as illustrated by time span 507, the terminal device 303 reduces the number of message requests or subscriptions in order to reduce the message quantity received from the exchange device 300.

Figure 9:
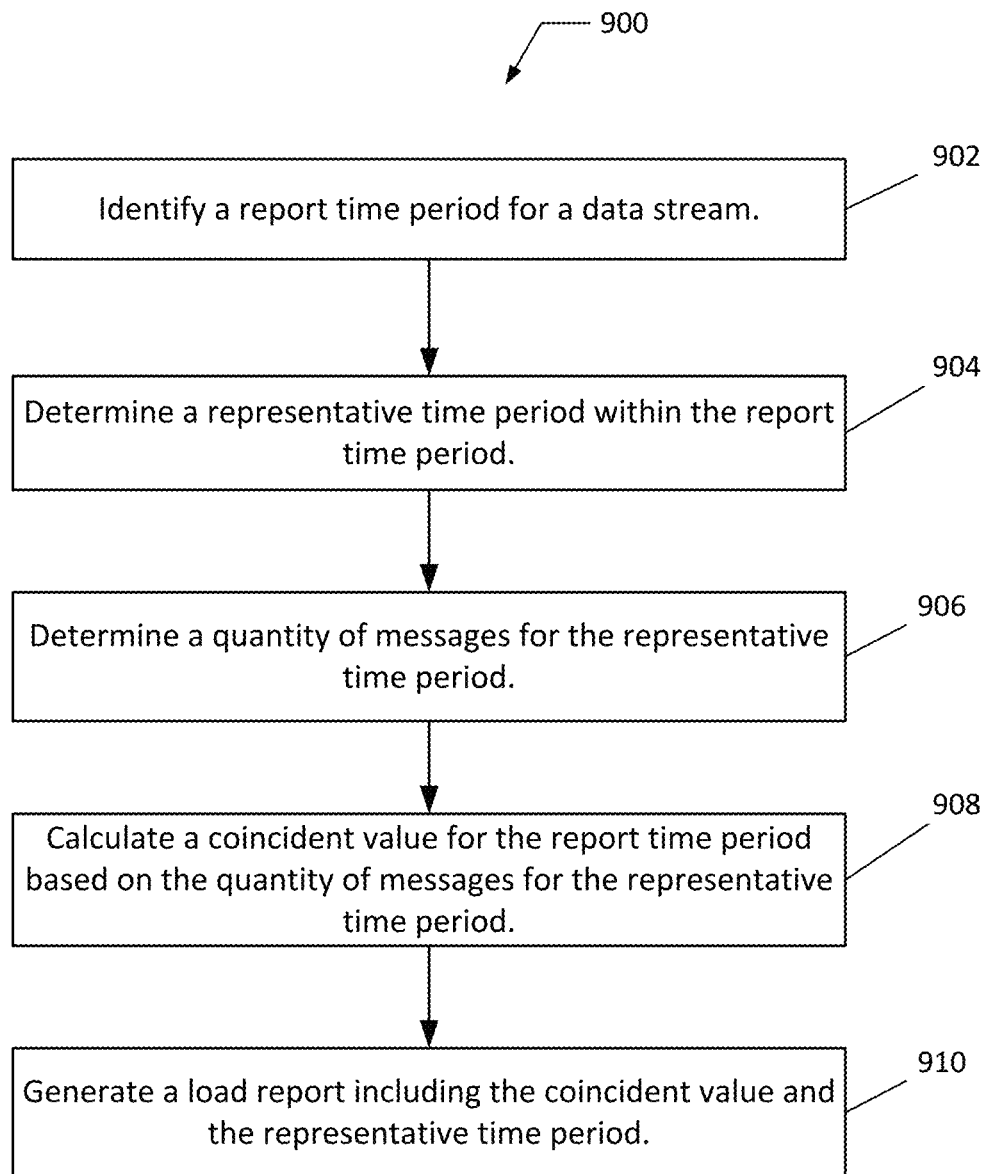
FIG. 9 illustrates an example flowchart for determining a coincident value between a streaming device and the terminal device, according to at least some embodiments.

FIG. 9 illustrates an example flowchart 900 for generating a coincident value for a data stream. The acts of flowchart 900 may be performed by any of the embodiments described herein. In addition to quotes for tradeable instruments, the data stream and associated message may be related to a media stream (e.g., audio stream or video stream). The exchange device 300 is an example of a streaming device. Alternatively, the streaming device may be a video streaming device such as a video server for a video streaming services (e.g., subscription television or audio and/or video calls). The streaming device may be a data server for a cloud-based data storage service. Any of these applications may be provided instead of, or in addition to, the tradeable instrument messages described herein.

In each of these examples, the flowchart 900 includes acts for generating a coincident value for the data stream between the streaming device and the terminal device according to the following acts. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the systems of FIGS. 1, 3, and 5, while in some other examples, some or all of the method may be performed by another machine.

At act 902, method 900 includes identifying an extended time period for a data stream from a streaming device to a terminal device. The data stream may include discrete messages from the streaming device to at least the terminal device in response to at least one request from the terminal device. The extended time period may be the extent of the stream itself. For example, the extended time period may be the duration of a video call, an audio call, or a media clip. Alternatively, the extended time period may be a predetermined time period defined with the data stream.

At act 904, method 900 includes determining at least one representative time period within the extended time period. The representative time period may be defined according to the volume of traffic transmitted from the streaming device. The streaming device may select a representative time period based on a comparison of the traffic to a threshold level. In another example, the representative time period is in a set number of busiest time windows in the extended time period. The streaming device may identify the representative time periods after the extended time period has past. However, an estimate of the representative time period may be identified during the extended time period while data is streaming from the streaming device to the terminal device.

At act 906, method 900 includes determining a quantity of discrete messages for the at least one representative time period that are associated with the terminal device. At act 908, method 900 includes calculating a coincident value for the streaming device and the terminal device over the extended time period based on the quantity of the plurality of discrete messages, for the at least one representative time period, from the exchange device to at least the terminal device.

At act 910, method 900 includes generating a load message including a first data field that corresponds to the at least one representative time period and a second data field that corresponds to the coincident value. The streaming device may send the load message to all associated terminal devices as a broadcasts with current volumes and/or a likelihood of the current time period being declared a peak time period.

Figure 10:
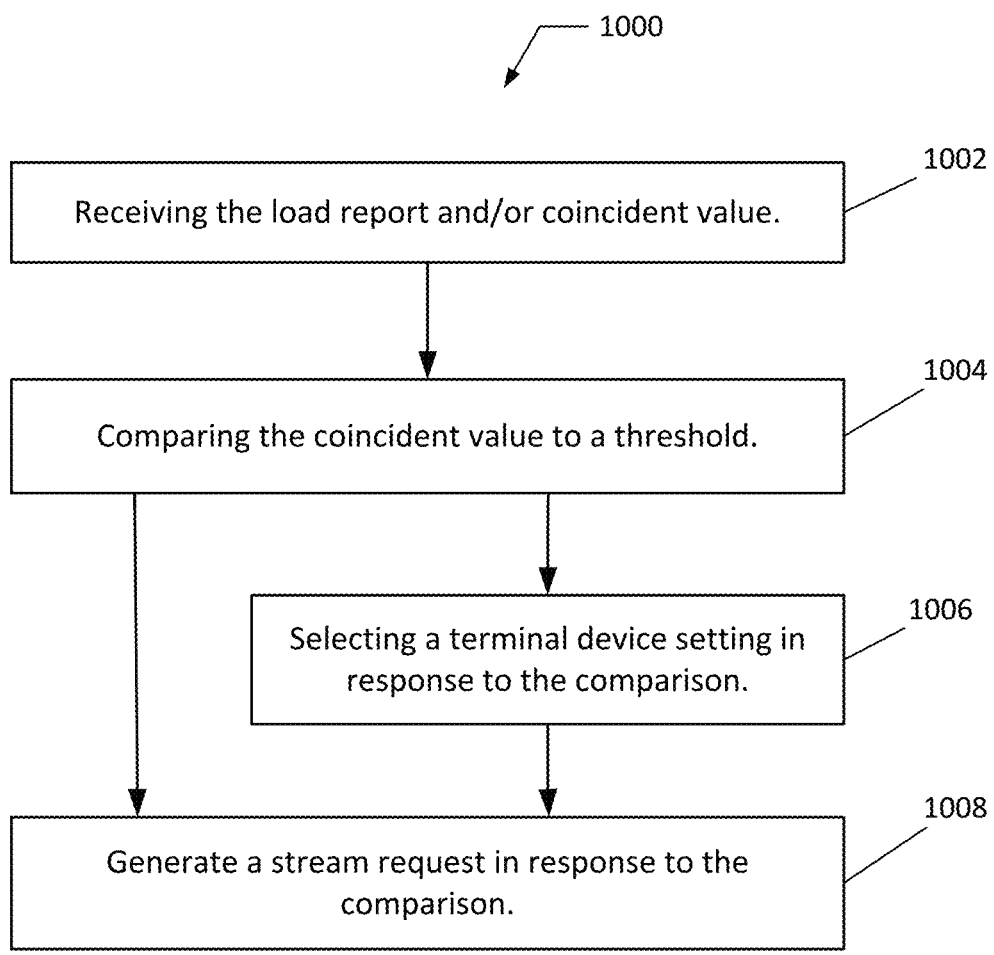
FIG. 10 illustrates an example flowchart for operating the terminal device in response to a coincident value for a data stream, according to at least some embodiments.

FIG. 10 illustrates an example flowchart 1000 for operating a terminal device in response to a coincident value for a data stream. The acts of flowchart 1000 may be performed by any of the embodiments described herein. As described above, to addition to quotes for tradeable instruments, the data stream and associated message may be related to a media stream received at the terminal device. In each of these examples, the flowchart 1000 includes acts for operation of the terminal device in response to the coincident value for the data stream between the streaming device and the terminal device. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the systems of FIGS. 1, 3, and 5, while in some other examples, some or all of the method may be performed by another machine.

At act 1002, method 1000 includes receiving the load report and/or coincident value for the terminal device over the extended time period based on the quantity of the plurality of discrete messages, for the at least one representative time period, from the exchange device to at least the terminal device. The terminal device is configured to identify and extract the coincident value from the load report.

At act 1004, method 1000 includes comparing the coincident value to a threshold. The coincident value may reflect the trends in the volume of data that is being transmitted by the streaming device. The terminal device may determine locally that the streaming device in reaching one or more data limits and that the probability of a coincident peak has increased. In some example, the terminal device may compare the coincident value to a threshold, and take action when the coincident value meets or exceeds the threshold. In other example, the comparison performed by the terminal device is dynamic. The terminal device may track the coincident value over time. The terminal device may aggregate a predetermined number of coincident values over an extended time period. The terminal device compares the aggregated values to a threshold to determined when the probability of a coincident peak for the streaming device has increased. When the probability for the coincident peak has increased, the terminal device may calculate a risk of high cost associated with the current representative time period or a subsequent representative time period.

At acts 1006 and 1008, which may be performed in the alternative or in combination, method 1000 includes taking an action by the terminal device in response to the coincident value and/or the comparison of the coincident value (or multiple coincident values) with the threshold. At act 1006, the terminal device may select a terminal device setting in response to the comparison. The setting may affect the stream of data. The setting may be a resolution for a media stream, a compression for a media stream, a frequency range for audio, a display size for video, or a subscription or refresh rate for messages quotes.

The local setting may trigger a communication sent back to the streaming device. For example, at act 1008, the terminal device may request a modification for the data stream by generating a stream request at the terminal device that is sent to the streaming device. The request for modification may request that the streaming device modify data traffic so as to achieve the purpose of the communication with some degradation. A media stream may be provided with different levels of compression and hence different video quality. In addition or in the alternative, the terminal device may locally adjust a compression setting or a video resolution setting in order to reduce traffic. For example, in response to the load message, the terminal device may change the compression setting from 4K to 1080p video or from compression with fewer artifacts to compression with more artifacts.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A non-transitory computer readable medium storing processor-issuable instructions that, when executed by at least one processor, are specifically configured to:
    receive, at a streaming device, a request for a data stream from a terminal device;
    determine a total time period for the data stream;
    determine a representative time period within the total time period;
    determine a quantity of discrete messages for the representative time period; and
    calculate a coincident value for the terminal device over the total time period based on the quantity of the discrete messages, for the representative time period, from the streaming device to the terminal device.

2. The non-transitory computer readable medium of claim 1, wherein the streaming device is an exchange and the discrete messages include quotes for one or more tradeable instruments associated with the exchange.

3. The non-transitory computer readable medium of claim 1, wherein the instructions that, when executed by at least one processor, are specifically configured to:
 generate a load message including a first data field that corresponds to the representative time period and a second data field that corresponds to the coincident value.

4. An apparatus comprising:
 a memory;
 a processor disposed in communication with said memory, and configured to issue a plurality of processing instructions stored in the memory that causes the apparatus to:
 receive, at a streaming device, a request for a data stream from a terminal device;
 determine a total time period for the data stream;
 determine a representative time period within the total time period;
 determine a quantity of discrete messages for the representative time period; and
 calculate a coincident value for the terminal device over the total time period based on the quantity of the discrete messages, for the representative time period, from the streaming device to the terminal device.

5. A computer implemented method for determining a coincident value between an exchange device and a terminal device, the computer implemented method comprising:
 identifying an extended time period for a data stream between the exchange device and the terminal device, the data stream including information for one or more tradeable instruments associated with the exchange device described in a plurality of discrete messages between the exchange device and at least the terminal device in response to at least one request from the terminal device;
 determining at least one representative time period within the extended time period;
 determining a representative quantity of the plurality of discrete messages for the at least one representative time period; and
 calculating the coincident value for the exchange device and the terminal device over the extended time period based on the representative quantity of the plurality of discrete messages, for the at least one representative time period, between the exchange device and at least the terminal device.

6. The computer implemented method of claim 5, wherein determining at least one representative time period within the extended time period further comprises:
 calculating the at least one representative time period according to a peak of total data for a plurality of data streams including the data stream for the terminal device.

7. The computer implemented method of claim 5, wherein the representative quantity is a count of the plurality of discrete messages, a byte count for the plurality of discrete messages, or a traffic intensity associated with the plurality of discrete messages.

8. The computer implemented method of claim 5, wherein the information for one or more tradeable instruments includes an identifier indicative of an asset and a quantity for the asset.

9. The computer implemented method of claim 5, further comprising:
 weighting a first type of the plurality of discrete messages according to a first weight; and
 weighting a second type of the plurality of discrete messages according to a second weight, wherein the coincident value is based on the first weight, the second weight, or the first weight and the second weight.

10. The computer implemented method of claim 5, wherein determining at least one representative time period within the extended time period comprises:
 receiving a load message at the terminal device from the exchange device; and
 selecting a data field from the load message that corresponds to the at least one representative time period.

11. The computer implemented method of claim 10, further comprising:
 extracting data from the data field of the load message for a message volume associated with the exchange device for the extended time period or the at least one representative time period.

12. The computer implemented method of claim 10, further comprising:
 extracting data from the data field of the load message for a message volume associated with the terminal device for the extended time period.

13. The computer implemented method of claim 10, further comprising:
 extracting data from the data field of the load message for historical message volume associated with the exchange device.

14. The computer implemented method of claim 10, further comprising:
 calculating a quote request factor in response to the load message.

15. The computer implemented method of claim 14, further comprising:
 generating a request for quote in response to the quote request factor.

16. The computer implemented method of claim 14, further comprising:
 filtering a request for quote in response to the quote request factor.

17. The computer implemented method of claim 5, wherein determining at least one representative time period within the extended time period comprises:
 identifying a plurality of potential time periods;
 performing a comparison of data usage for the plurality potential time periods; and
 selecting the at least one representative time period based on the comparison.

18. The computer implemented method of claim 5, further comprising:
 generating a load message including a data field that corresponds to the at least one representative time period.

19. The computer implemented method of claim 5, wherein the coincident value for the exchange device and the terminal device describes a contribution of the terminal device to a peak level of the exchange device.

20. The computer implemented method of claim 5, wherein the coincident value for the exchange device and the terminal device describes a ratio of messages during the representative time period for the terminal device to message for the exchange device.

* * * * *